June 6, 1967  J. L. WATERS  3,323,410
CRITICAL ANGLE REFRACTOMETER
Filed Oct. 4, 1963  2 Sheets-Sheet 1

INVENTOR.
JAMES L. WATERS
BY
Blair & Buckles
ATTORNEYS

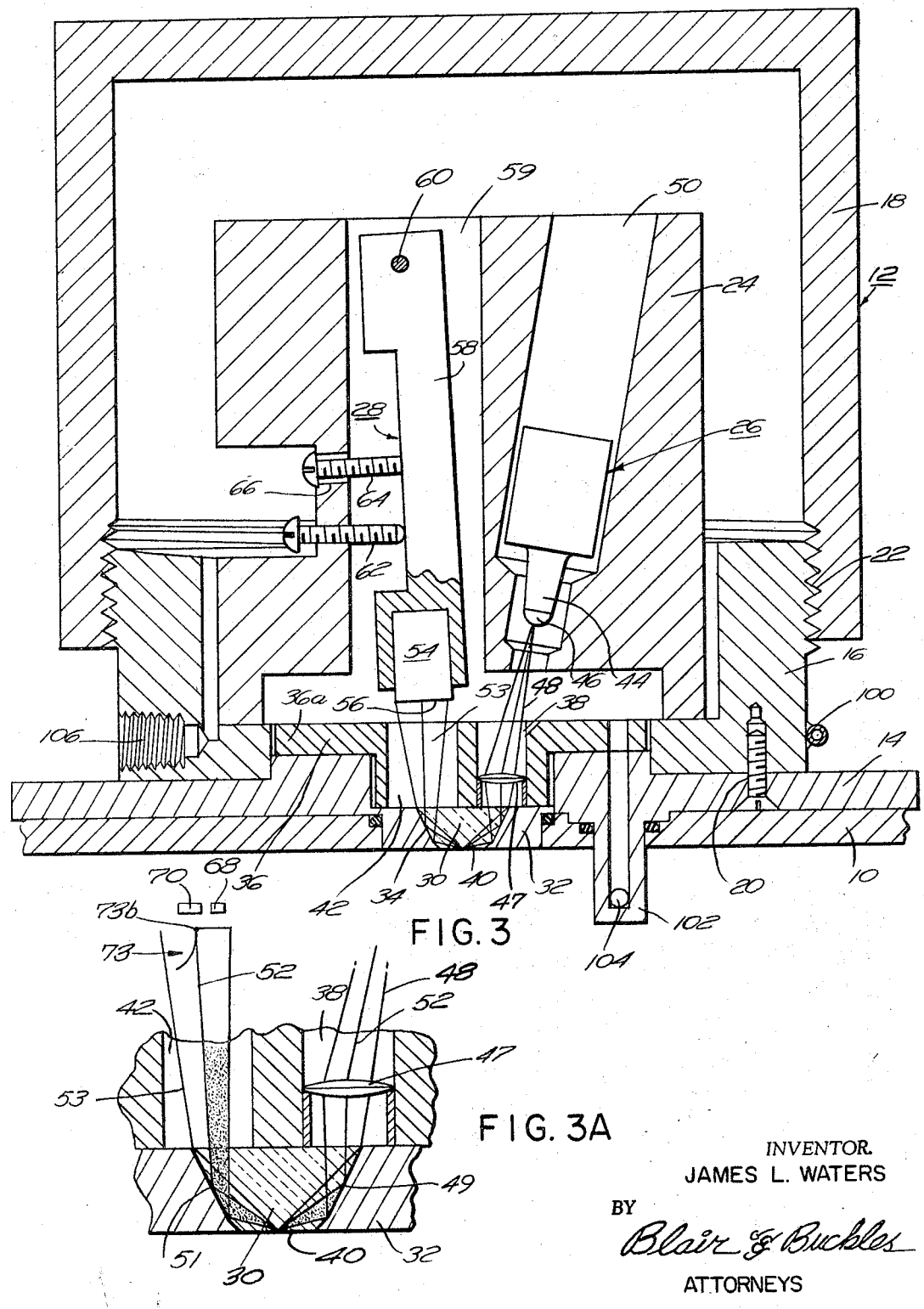

United States Patent Office 3,323,410
Patented June 6, 1967

3,323,410
CRITICAL ANGLE REFRACTOMETER
James L. Waters, Framingham, Mass., assignor to
Waters Associates, Framingham, Mass.
Filed Oct. 4, 1963, Ser. No. 313,860
8 Claims. (Cl. 88—14)

This invention relates to a critical angle refractometer. More specifically, it relates to a refractometer which responds to differences between the refractive index of a monitored fluid stream and that of a standard prism. The instrument examines light reflected from the interface between the prism and the fluid and compares the difference in intensity of light reflected from angles greater and less than the critical angle at which total reflection begins.

The invention also concerns an improved standard prism providing improved operation in critical angle refractometers, particularly in refractometers used to monitor fluid streams.

In a critical angle refractometer light is reflected from the interface between media having different refractive indices. When light approaches such an interface from the denser medium, there is an angle of incidence, termed the "critical" angle, at which the light is totally reflected. There is also total reflection at all angles greater than the critical angle. This angle is related to the indices of refraction of the optical media by $$\sin \alpha = n_2/n_1 \qquad (1)$$

where $\alpha$ is the critical angle,
$n_1$ is the index of refraction of the denser medium, and
$n_2$ is the index of refraction of the less dense medium.

It will be apparent that if $n_1$ is known, $n_2$ can be determined by a measurement of the critical angle.

Some critical angle refractometers provide a direct visual indication of the measured index of refraction and others provide an electrical output indicative of the index. The electrical systems are more suited to applications where remote observation of the index of refraction is desired and also in situations where automatic recording of the index or control of various operations in accordance therewith is to be undertaken. The electrical systems generally used prior to the present invention are of the servo rebalancing type. An electrical error signal adjusts the position of an element in the optical system to minimize the signal. The position of the adjustable element is a function of the monitored index of refraction and a second signal indicative of this position is the output of the system.

The servo technique provides a high degree of accuracy. However, apparatus making use of this technique is relatively expensive. Furthermore, the time required for the rebalancing operation may be excessive in some applications which require a rapid response to changes in the monitored index of refraction.

Accordingly, the principal object of the invention is to provide a critical angle refractometer suitable for the measurement of the index of refraction in a fluid stream.

Another object of the invention is to provide a refractometer of the above type which has an electrical output signal directly related to the monitored index of refraction. More specifically, it is an object of the invention to provide a refractometer having an electrical output which does not make use of servo balancing techniques.

A further object of the invention is to provide a refractometer of the above type which has an output signal that varies linearly with the index of refraction or some other property of the monitored fluid to which the index of refraction is related.

Another object of the invention is to provide a refractometer of the above type characterized by a relatively low cost.

Still another object of the invention is to provide a refractometer of the above type which may be readily mounted on various fluid containers, including conduits carrying moving fluid streams.

A still further object of the invention is to provide a refractometer which is relatively immune to abrasion and chemical attack by the monitored fluid.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 3 is a cross-section of the optical system and related parts of a refractometer embodying the invention;

FIG. 3A is a fragmentary enlarged view of the prism and adjacent parts shown in FIG. 3;

Figure 1:
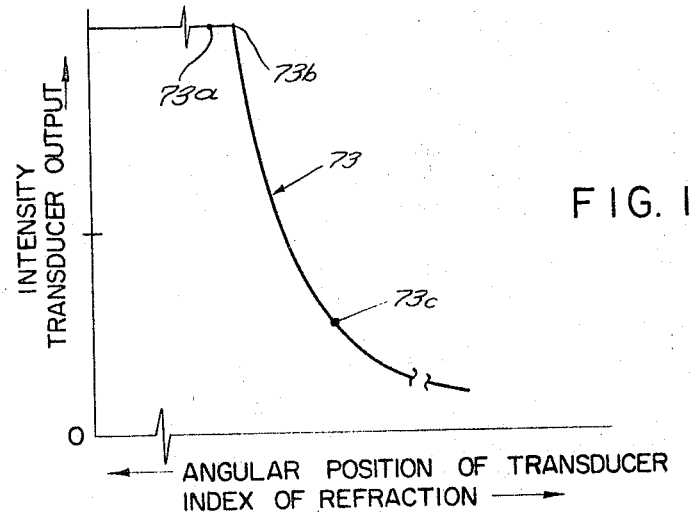
FIG. 1 is a graphical representation of the manner in which the intensity of light reflected from the interface between two optical media varies as a function of the angle of reflection.

In common with prior critical angle refractometers, the present invention makes use of a prism having a known index of refraction, with a face of the prism in contact with the substance whose index is to be measured. A beam of light is passed through the prism toward this prism-fluid interface and light reflected from the inter-, face is intercepted by suitable photosensitive transducers.

The light is directed to the interface over a range of angles including the critical angle. Thus, the intensity of the reflected light reaching each transducer is a function of the position of the transducer in the reflected beam. More specifically, it is a function of the angular position of the transducer relative to the critical angle.

One of the transducers is so positioned that it receives light reflected from a relatively broad range of angles both greater and less than the critical angle. At angles only slightly less than the critical angle, the intensity of light reflected from the prism-fluid interface is much less than the intensity of light coming from the total reflection region, i.e. angles greater than the critical angle. Therefore, to a first approximation, the portion of the transducer receiving light from angles less than the critical angle may be considered to have a uniformly low illumination as compared with the portion receiving light from angles greater than the critical angle. That is, the transducer has a light portion on one side of the critical angle and a dark portion on the other side thereof. Since the critical angle varies with the monitored index of refraction, changes in the index cause the light reflected from this angle to move across the transducer, thereby varying the relative sizes of the light and dark portions. This, in turn, results in a change in the electrical output of the transducer which is roughly proportional to the change in the refractive index.

The other transducer is positioned to receive light reflected at angles exceeding the critical angle. All of this incident light is reflected and thus the proportion of reflected light is independent of the angle of reflection. Specifically, over the range of operation of the instrument, this detector receives only light which is reflected from angles greater than the critical angle, regardless of the variation of the critical angle in response to changes in the monitored index of refraction. The outputs of the two transducers are compared in a bridge circuit which is responsive to their ratio.

I have found that with proper positioning of the detectors, the output of the bridge circuit is linearly related to the monitored index of refraction over a substantial range thereof. Alternatively the physical arrangement may be altered slightly to provide a linear relationship between the output voltage and another quantity, such as the concentration of a given ingredient in the monitored fluid, which affects the index of refraction.

With reference to FIG. 3 a typical installation of the refractometer includes a conduit 10 containing a moving stream of the fluid whose index of refraction is to be monitored. A refractometer generally indicated at 12 includes a housing comprising a base plate 14, an annular member 16 and an outer cup 18. The member 16 is secured to the base plate 14 by bolts 20 and the cup 18, in turn, is secured to the member 16 by means of an interfitting thread 22. A block 24, containing a light source generally indicated at 26 and a detector unit generally indicated at 28, is suitably secured as by bolts (not shown) within a recess in the member 16.

A prism 30 is provided with a generally trapezoidal cross section so as to fit within a similarly shaped hole in a projection 32 of the base plate 14 extending through the wall of the conduit 10. The prism, which is surrounded by a suitable gasket 34, is held in place by a pressure plate 36 having a flange portion 36a bolted to the base plate 14. During operation of the refractometer light from the light source 26 passes through a hole 38 in the pressure plate 36 and then on through the prism 30 to the surface 40 thereof which is in contact with the fluid in the conduit 10. A portion of the light incident of this surface is reflected, as described above, and this reflected light passes through a second hole 42 in the pressure plate toward the detector unit 28.

More specifically, the light source 26 includes a bulb 44 provided with a lens 46 at the tip thereof. A light beam 48 from the lens 46 passes through a second lens 47 disposed in the hole 38 to a flat reflecting surface 49 of the prism. Through the action of the lens system, the beam 48 then converges at a point on the surface 40 so that the light incident on the prism-fluid interface at this surface arrives at the interface and is reflected therefrom over a range of angles. The light source 26 is positioned in a bore 50 which is so oriented that the range of angles in which the beam 48 is incident on the surface 40 includes the critical angle determined by the ratio of the indices of refraction of the prism 30 and the fluid in the conduit 10.

For example, assume that the light ray indicated at 52 is incident on the surface 40 at the critical angle. Then the shaded portions of the incident beam 48 will undergo total reflection at the surface 40. The unshaded portions of the incident beam will be partially reflected from the surface 40, the proportion of the incident light being reflected depending on the proximity of the angle of incidence to the critical angle. The proportion of incident light which is reflected diminishes in going away from the ray 52. In the reflected beam 53 the region of total reflection is again the shaded portion thereof. After leaving the surface 40, the beam 53 is reflected from a second flat reflecting surface 51 toward the detector unit 28.

With further reference to FIG. 3, the detector unit 28 includes a head 54 having a face 56 disposed in the path of the reflected beam 53. The head 54 is carried on an arm 58 disposed in a bore 59 and mounted for rotation on a pivot pin 60. An adjustment screw 62 extends through a threaded hole in the block 24 and has an end bearing against the arm 58. A second adjustment screw 64, which extends loosely through a hole 66 in the block 24, has an end threaded into the arm 58 and a head which bears against the outer surface of the block 24. Thus, the screw 54 pushes against the arm 58 and the screw 54 pulls on it, and between them they serve to tightly lock the detector unit 28 in any desired angular position of the unit 28, but loosening one of the adjustment screws and tightening the others, serves to move the face 56 of the head 54 across the reflected beam 53. The purpose of such adjustment is set forth below.

Figure 4:
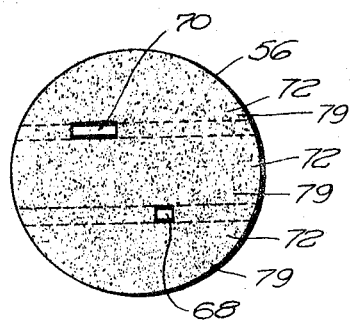
FIG. 4 is a front view taken along line 4—4 of FIG. 3, of the detector unit used in the refractometer.

As seen in FIG. 4 the detector face 56 supports a pair of photosensitive transducers 68 and 70. The transducers are preferably in the form of a layer of photoresistive material such as cadmium sulfide, bonded to a dielectric substrate. The transducers are provided with electrodes 72 to which are attached wires (not shown) extending through the face 56 and back through the detector unit 28 (FIG. 3). Preferably, the transducers are congruent so as to have the same electrical resistance. The photosensitive areas of the detectors are controlled by masking, which in the case of visible light can be accomplished by the application of black lacquer indicated at 79. The electrodes 72, which are applied over the photoresistive material, also serve to define the sensitive areas.

By means of the masking technique, the exposed area of the transducer 68 is made less than that of the transducer 70. For example, a ratio of one-half provides satisfactory results in most applications. With the light sensitive area of the transducer 68 thus reduced with respect to its total area, the sensitivity of this transducer is correspondingly reduced, and with the above ratios its sensitivity is one-half that of the transducer 70. That is, assuming equal intensity of illumination of the transducers 68 and 70, the change of resistance of the transducer 68 from the value in the absence of illumination is one-half the corresponding figure for the transducer 70.

Preferably the detector unit 28 is so positioned in the reflected beam 53 that the critical angle ray 52 falls on the active portion of the transducer 70 over the range of operation of the instrument. Thus, the transducer 68, which is in the region of total reflection, receives illumination which does not vary as the critical angle varies in response to changes in the monitored index of refraction. On the other hand, the illumination intercepted by the transducer 70 varies as the ray 52 moves to the right and left (FIG. 4) over this transducer in response to changes in the index.

FIG. 1 shows the variation in the electrical output, i.e. change of conductance from initial value, of a narrow aperture transducer of the photoresistive type as a function of the monitored index of refraction. The transducer has a fixed position. First assume that this hypothetical narrow aperture transducer is positioned in the region of total reflection when the critical angle is small, corresponding to a low value of the refractive index. Thus, the operating point of the transducer is on the horizontal portion 73a of the curve 73. In this connection it is noted that the curve 73 and the reflected beam 53 of FIGS. 3 and 3A are reversed with respect to each other. That is, the region of total reflection on the curve 73 is at the left thereof, whereas the same region is the right hand portion of the beam 53.

With further reference to FIG. 1, if the monitored refractive index $n_2$ increases, the operating point will move to the right along FIG. 1. When the point 73b is reached, the index of refraction is such that critical angle corresponds to the position of the transducer, i.e. the ray 52 of FIG. 3 falls on the transducer. Further increase in the index then brings the operating point of the transducer to the point 73c, where the intensity of the light intercepted by the transducer is abruptly reduced and the electrical output thereof is correspondingly diminished.

As shown in FIG. 3A, another way to view the above sequence is to consider the superposition of the curve 73 on the reflected beam 53. The curve represents the light intensity at various points across the beam, with the critical angle ray 52 corresponding to the point 73b on the curve. Thus, in essence, the beam 53 carries an "image" of the curve 73. When the index of refraction increases, the critical angle increases and the ray 52 moves to the right. As it does so, the point 73b moves to the right along with the rest of the curve 73. In other words, the projected "image" of the curve 73 moves back and forth as the monitored refractive index changes. The effect of such movement of this "image" on the output of the hypothetical transducer positioned in the beam 53 will be as described above.

The transducer 70 has a fairly wide aperture and thus it intercepts light reflected from a substantial sector of angles of reflection, as shown in FIG. 3A. Over the preferable range of operation, the critical angle ray 52 (FIG. 3) always falls on the transducer 70.

With further reference to FIG. 3A, the curve 73 has been drawn to a nonlinear vertical scale, in order to facilitate its inclusion in the drawings. Actually, the intensity falls off drastically at angles slightly less than the critical angle. Thus the portion of the transducer to the left of the ray 52 (point 73b) may, to a rough first approximation, be considered as totally dark compared to the portion in the total reflection region to the right of the ray 52. As the ray 52 in effect moves to the right or left in response to changes in the index $n_2$, the size of the illuminated portion of the transducer 70 changes correspondingly. In fact, over the range of operation of the refractometer, e.g. a full-scale variation of 0.04 in the index of refraction, the width of the illuminated portion varies substantially linearly with the refractive index $n_2$.

Figure 2:
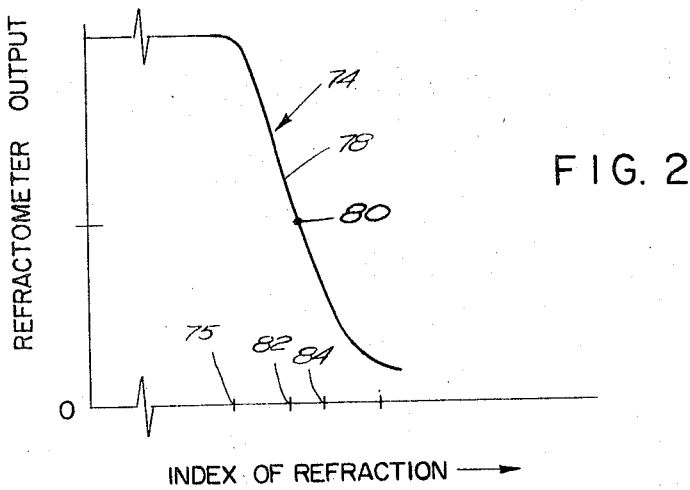
FIG. 2 is a graphical representation of the manner in which the output of a transducer positioned in the reflected beam varies as a function of the index of refraction.

The curve 74 of FIG. 2 represents the measured response of the transducer 70 to variations of the monitored refractive index $n_2$ when the transducer is connected in the output circuit described below. It also represents the measured ratio of the response of this transducer to a constant value. Thus, since the output of the transducer 68, which is preferably in the region of total reflection over the range of operation (see FIG. 3A), is a constant (except as noted below), the curve 74 also represents the ratio of the outputs of the two transducers, though with a different scale factor.

It is seen that beginning at the vertical axis, the output of the transducer 70 has a constant value, as the transducer moves to the right. This continues until the coordinate 75 is reached by the leading edge 76 of the transducer (FIG. 1). The coordinate 75 corresponds to the point 73b of FIG. 1. The transducer output then decreases in a section 78. This section 78 is almost linear. However, there is a point of inflection, for example at 80. To the left of this point the curve 74 is very slightly concave downward and to the right it is concave upward. The region of maximum linearity encompasses the inflection point 80 and ordinarily the range of operation of the instrument corresponds to this region, as delimited for example by the coordinates 82 and 84.

Physical movement of the transducer 70 across the reflected beam moves the operating range of the refractometer along the curve 74 of FIG. 2. Thus, such movement can be utilized to make this range coincide with the coordinates 82 and 84, for example. Such adjustment may be accomplished, as described above with reference to FIG. 3, by means of the adjustment screws 62 and 64.

The characteristics of the section 78 are affected by the size of the active area of the transducer 70, in particular by the range of angles of reflected light intercepted by the active area.

It will be appreciated that adjustment in this manner enables one to use the same instrument for operation in different ranges of index of refraction. If the range measured by the refractometer is changed, there is a corresponding shift along the curve 74. The instrument is then brought back to the desired operating range, e.g., between the coordinates 82 and 84, by adjustment of the position of the detecting unit 28 (FIG. 3).

Figure 5:
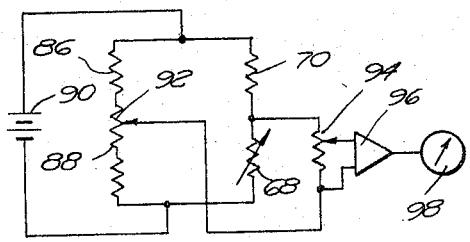
FIG. 5 is a schematic representation of the electrical circuit used in the refractometer.

In FIG. 5 I have illustrated a circuit which provides an output indication corresponding to the monitored index of refraction. The transducers 68 and 70 are connected, as shown, in a bridge circuit with resistors 86 and 88. The circuit is illustratively powered by a battery 90 and the output, i.e., the unbalance voltage of the bridge, is taken from the junction of the transducers 68 and 70 and the tap of a potentiometer 92 connected between the resistors 86 and 88. The unbalance voltage is passed through a second potentiometer 94 to an amplifier 96 and the output of the amplifier is registered by a meter 98. The bridge load, including the potentiometer 94 preferably has an impedance substantially greater than the internal impedance of the bridge, so as to have negligible effect on the unbalance voltage.

The potentiometer 92 serves to provide initial balance to the bridge and thus sets the zero point of the meter 98. The potentiometer 94 facilitates adjustment of the magnitude of the voltage applied to the meter 98. Thus, the potentiometers 92 and 94 together may be used to calibrate the meter by setting the initial value of the index of refraction corresponding to the initial point on the meter and the range of index of refraction corresponding to full scale deflection. The meter may conveniently be calibrated in terms of index of refraction.

I have found that with the relatively small variation in the resistance $R_{70}$ of transducer 70 corresponding to the operation range of the refractometer, the deflection of the meter 98 is proportional to the change in index of refraction from the initial value corresponding to zero deflection of the meter. That is, the output voltage of the bridge circuit is linearly related to the monitored index of refraction over the operating range. This is a highly unexpected result in view of the various nonlinear relationships involved, viz. (1) between the index and the light-intensity at a given point in the reflected beam (the portion of the curve 73 of FIG. 1 between the points 73b and 73c); (2) between the resistance of the transducer 70 and the size of the illuminated area thereof; and (3) between the output voltage of the bridge circuit and the resistance of the transducer 70.

In some cases it is desired to use the index of refraction as a means for ascertaining the concentration of a given chemical in a solution. In such case the meter 98 may be calibrated in terms of the concentration. There is generally a slightly nonlinear relationship between the concentration of the chemical and the index of refraction measured by the refractometer. However, this can in many cases be offset by shifting the operating point of the refractometer from the linear portion of the section 78 (FIG. 2) to one side or the other thereof having a concavity which compensates for the nonlinear relationship.

It will be apparent that since the output of the detector 68 is constant over the range of operation of the refractometer (see FIG. 1), this detector might be replaced by a fixed resistor in the bridge circuit of FIG. 5. However, in that case variations in the intensity of the light emanating from the light source 26 would be reflected in the output of the bridge circuit inasmuch as they would change the resistance of only the detector 70. With the resistance $R_{68}$ of transducer 68 also responsive to the intensity of the light source 26, variations in such intensity are in essence canceled out in the bridge circuit.

The detector 68 might be exposed to light coming directly from the source 26 instead of by way of a reflection from the surface 40 (FIG. 3), but I find the illustrated system to be preferable. For example, contamination of the surfaces of the prism 30 will affect the intensity of the light reaching the detector 70. In the illustrated system the intensity of the light incident on the detector 68 will be similarly affected and the bridge circuit will again cancel out this spurious signal. This will not be the case if the detector 68 receives its light directly from the source 26.

It will be apparent that other means than the one shown may be used to provide different sensitivities for the transducers 68 and 70. For example, the two transducers might have the same ratio of active area to total area, with a conventional resistor connected in series with the transducer 70. The percentage variation in the resistance of this series combination will then be less than that the transducer 70 and with the series combination forming one arm of the bridge circuit of FIG. 5, operation will be as-described above. Moreover, other sensitivity ratios than the 2–1 ratio described above may be desirable in some applications. In any case, the voltage gradients along the two detectors should not differ so much that the ratio of their sensitivities is such as to change the unbalance voltage appreciably when the light source intensity varies.

Following are examples of various dimensions of the refractometer:

Range of angles of reflection intercepted by transducer 70, about 2 degrees.
Length of active area of transducer 70 in direction of change of critical angle, 0.04 inch.
Width of active area of transducer 70, 0.02 inch.

It will be understood that one may utilize other means of providing a range of angles of incidence than the system illustrated herein. For example, the incident light beam 48 may be divergent, or it may converge at another location than the prism-fluid interface. Alternatively a parallel incident beam may be used, with the surface 40 of the prism 30 curved to provide a range of angles of incidence. In any case it is generally desirable that the reflected beam diverge before it reaches the photosensitive transducers, so that a given change in the measured index of refraction results in a substantial change in the light flux incident on the transducer 70.

With further reference to FIG. 3, the annular member 16 may be provided with a temperature controlling system in cases where the temperature of the fluid carried in the conduit 10 is such as to adversely affect the operation of the components within the refractometer housing. A pipe 100 extending most of the way around the member 16 is brazed to the member to provide good thermal conduction therewith. A fluid having a suitable temperature is passed through the pipe 100, thus changing the temperature of member 16 to thermally isolate the portions of the refractometer above (FIG. 3) the pipe from the fluid in the conduit 10.

Since the refractive index of an optical medium is generally a function of the temperature thereof, it may be desirable to provide temperature compensation of the refractometer output when the instrument is used for determination of a quantity such as the concentration of an ingredient. To this end, the base plate 14 may be provided with an elongated projection 102 (FIG. 3) extending through a hole in the conduit 10 and into the fluid therein. A thermistor 104, disposed with the projection 102, senses the temperature of the fluid. In accordance with conventional techniques, the thermistor may be included in a second bridge circuit (not shown) whose output signal is summed with that of the bridge circuit of FIG. 5 to provide the desired compensation.

Among the advantages of the construction shown in FIG. 3 are its compactures and its explosion-proof arrangement. The only opening to the interior of the housing is a hole 106, threaded to receive a conduit carrying electric connections for the light source 26 and the detecting unit 28.

Another advantage lies in the fact that the optical system, i.e. source 26, lenses 46 and 47, prism 30 and detecting unit 28, is removable and replaceable as a unit together with the housing containing the parts. That is, the base plate 14 may be unfastened from the conduit 10 and a new refractometer emplaced by securing its base plate to the conduit. Since the relative positions of the various parts of the optical system are thus undisturbed during installation of the refractometer, adjustment of these parts and calibration of the instrument can be performed at the factory rather than "on the job," with a consequent saving in cost as well as enhancement of accuracy.

While various types of glass have been used for the prisms in prior critical angle refractometers, glass has certain shortcomings in such instruments. In the first place it is subject to chemical attack by many of the fluids whose index of refraction is to be monitored. Moreover the particles in many fluid streams seriously abrade glass. As a result glass prisms must be replaced quite often in many applications, with a consequent material increase in expense because of the cost of installation of the prisms as well as the cost of the prisms themselves. Not to be overlooked is the cost of interruption of the processes which require the use of the instruments.

I have found that greatly improved refractometer prisms can be made from spinels. The spinels have a cubic crystalline structure and are thus isotropic insofar as the index of refraction is concerned. They are readily polished to provide the required surfaces and they have an index of refraction approximately in the range of 1.68 to 1.80. The lower limit of the index of refraction is determined by the material whose index of refraction is to be measured, since the index of the prism must exceed that of the monitored material. The upper limit is a result of the fact that as the difference between the index of the refraction of the prism and that of the monitored material increases, the critical angle decreases. However, it is desired that this angle be fairly large, since at larger angles the variation of the critical angle as a function of the monitored index is greater and the sensitivity of the refractometer is correspondingly enhanced.

The spinels used as prisms have been found to provide a substantial improvement over glass in respect to both chemical activity and resistance to abrasion and I have found that their service life is correspondingly greater than that of glass. Moreover the cost of the spinel prisms is sufficiently low to permit substantial overall savings in the use of refractometers incorporating them instead of glass prisms.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. A critical angle refractometer comprising
   (A) a prism having a surface positioned for contact with a fluid whose index of refraction is to be measured,
   (B) a light source arranged to direct a beam of light through said prism to said surface,
   (C) said beam forming a range of angles of incidence with said surface including the critical angle corresponding to the ratio of the index of refraction of said fluid to that of said prism,
   (D) a first photosensitive electrical transducer positioned to receive light reflected from a plurality of angles including said critical angle,

9

(E) a second photosensitive transducer arranged to intercept light reflected only from angles greater than said critical angle over the range of operation of said refractometer so that the light flux received by said second transducer is independent of said critical angle, and (F) electrical output means responsive to the outputs of said transducers.

2. The combination defined in claim 1 in which said first transducer and said output means are arranged to provide a signal substantially proportional to the area of said first transducer illuminated by light totally reflected from said surface.

3. The combination defined in claim 2 in which said signal from said output means further corresponds to the ratio of the outputs of said first and second transducers.

4. A critical angle refractometer comprising (A) a prism having a surface positioned for contact with a fluid whose index of refraction is to be measured, (B) a light source arranged to direct a beam of light through said prism to said surface, whereby said beam forms a range of angles of incidence with said surface including the critical angle corresponding to the ratio of the index of refraction of said fluid to that of said prism, (C) a first photosensitive electrical resistor positioned to receive continuously light from said source reflected from said surface over a plurality of angles spanning said critical angle, (D) a second photosensitive resistor
   (1) positioned to receive light from said source reflected from said surface only at angles which are greater than said critical angle,
   (2) having a resistance substantially the same as the resistance of said first resistor when both resistors are unilluminated,
   (3) having an aperture substantially smaller than that of said first resistor, (E) electrical output means responsive to the ratio of the resistances of said first and second resistors, (F) said output means providing a signal which is linearly related to the quantity measured by said refractometer over the operating range thereof.

5. A refractometer comprising (A) a base plate having an aperture therein, (B) a prism disposed in said aperture and having an exterior surface exposed on one side of said base plate, (C) a light source directing a beam of light through said prism to said surface, (D) mounting means securing said light source with respect to said base plate and said prism and orienting said light source in such manner that said light beam approaches said surface over a range of angles including the critical angle defined by the refractive index of said prism and that of a fluid contacting said surface, (E) a detector unit including
   (1) a first photoresistive transducer positioned to continuously intercept light reflected from said surface over a range of angles including said critical angle,
   (2) mounting means for securing said transducer with respect to said prism and adjusting the position of said transducer with respect to said reflected light so as to vary the portion of said transducer illuminated by light reflected from angles greater than said critical angle,
   (3) a second photoresistive transducer positioned to intercept light reflected only from angles

10 greater than said critical angle over the range of operation of said refractometer,
   (4) said first transducer including a pair of electrodes for connections to said first transducer, said electrodes extending along said transducer in the direction of movement of the critical angle light ray along the transducer in response to changes in said index of refraction.

6. A refractometer comprising (A) a base plate having a first projection extending from a first side thereof, (B) means forming an aperture extending through said projection, (C) a prism disposed in said aperture, (D) means securing said prism in said aperture, (E) a hollow first member secured to said base plate and encompassing said prism, (F) a light source projecting a beam of light, (G) a transducer head carrying first and second photosensitive transducers, (H) mounting means secured to said first member,
   (1) supporting said light source in such orientation as to project said beam of light through said prism to a surface of said prism exposed on said first side of said base plate and
   (2) supporting said transducer head in such position that
      (a) said first transducer continuously receives light reflected from said surface over a constant range of angles including the critical angle defined by the index of refraction of said prism and that of the fluid exposed to said surface, and
      (b) said second transducer receives light reflected only from angles greater than said critical angle over the range of operation of said refractometer, (I) whereby said refractometer may be installed and removed as a unit without changing the relative positional relationships of said prism, said light source and said transducer head.

7. The combination defined in claim 6 including (A) electrodes for connection to said first transducer, said electrodes extending along said transducer in the direction of movement of the critical angle light ray along said transducer in response to changes in said index of refraction and defining the width of said transducer transverse to said direction of movement, and (B) electrical output means connected to said electrodes and providing an output signal corresponding to the ratio of the outputs of said first and second transducers.

8. The combination defined in claim 6 including means for adjusting the position of said transducer head in the beam of light reflected from said surface in the same direction as the direction of movement of the critical angle light ray across said transducer in response to changes in said index of refraction of said fluid.

References Cited

UNITED STATES PATENTS

| | | | |
|---|---|---|---|
| 2,306,777 | 12/1942 | Hansen et al. | 88—14 |
| 2,885,923 | 5/1959 | Simmons | 88—14 |
| 2,966,091 | 12/1960 | Goldberg | 88—14 |
| 2,977,842 | 4/1961 | Duke | 88—14 |
| 3,066,570 | 12/1962 | Goodman et al. | 88—23 |

JEWELL H. PEDERSEN, *Primary Examiner.*

B. LACOMIS, *Assistant Examiner.*